US006889816B2

(12) United States Patent
Willing

(10) Patent No.: US 6,889,816 B2
(45) Date of Patent: May 10, 2005

(54) DEVICE FOR INSERTING AND REMOVING WORK STATIONS CIRCULATING ON CHAIN

(75) Inventor: Bernd Willing, Bonn (DE)

(73) Assignee: Hennecke GmbH, Leverkusen (DE)

( * ) Notice: Subject to any disclaimer, the term of this patent is extended or adjusted under 35 U.S.C. 154(b) by 0 days.

(21) Appl. No.: 09/195,005

(22) Filed: Nov. 18, 1998

(65) Prior Publication Data

US 2001/0011629 A1 Aug. 9, 2001

(30) Foreign Application Priority Data

Nov. 28, 1997 (DE) ......................................... 197 52 750

(51) Int. Cl.[7] .............................................. B65G 29/00
(52) U.S. Cl. ................................................. 198/465.2
(58) Field of Search .......................... 198/346.1, 465.1, 198/465.2, 795, 867.01, 867.15

(56) References Cited

U.S. PATENT DOCUMENTS

| 2,789,683 A | * | 4/1957 | Stahl ........................... 198/795 |
| 3,010,410 A | | 11/1961 | Daniels ....................... 104/137 |
| 3,807,314 A | | 4/1974 | Slemmons .............. 104/148 R |
| 5,934,444 A | * | 8/1999 | Kierpaul et al. .......... 198/465.1 |

FOREIGN PATENT DOCUMENTS

| DE | 195 14 206 | 10/1996 |
| JP | 61-226356 | 10/1986 |

* cited by examiner

Primary Examiner—Joseph Valenza
(74) Attorney, Agent, or Firm—Joseph C. Gil; Noland J. Cheung

(57) ABSTRACT

A device for carrying out a sequence of working steps on travelling work station wagons comprising an oval track wherein said work station wagons are circulating, wherein said wagons comprise at least one detachable connection element connected to a circulating chain which moves said wagons; at least one insertion and at least one removal guide track is provided on the outside of said oval track, wherein said at least one insertion and at least one removal guide track comprises a transfer point to which the chain is allocated; at least one coupling element is further provided at each transfer point via which the wagons may be coupled into the guide tracks on the side opposite of the side of said wagons comprising at least one detachable element, with at least one switchable points element located on said guide track, which during the insertion position, release said at least one coupling element and bring about the engagement of said detachable connection element to said chain or during the removal position, couple the coupling elements and removably detach said at least one detachable connection from said chain.

3 Claims, 4 Drawing Sheets

DEVICE FOR INSERTING AND REMOVING WORK STATIONS CIRCULATING ON CHAIN

BACKGROUND OF THE INVENTION

To carry out a uniform sequence of working steps at a plurality of work stations, frequently, each individual working step is repeated at a stationary position, wherein a plurality of work stations, driven on a belt or a chain, passes by the location in which each particular working step is carried out.

A uniform sequence of working steps may, for example, be the assembly of a device, wherein the various assembly steps are carried out at different locations and the part to be assembled is moved on a work station from location to location for the various assembly steps to be carried out. A similar arrangement may be used in the production of molded parts, in which the working steps comprise cleaning the mold, providing the mold with a release agent, inserting a displacement body, filling the mold for the first time, curing the first molded part, removing the displacement body, filling the mold for the second time, curing the second mold contents, opening the mold and removing the molded part. Such working steps are carried out at different locations, wherein the mold is conveyed on a work station from one location to the other.

The work stations may take the form of work station wagons, wherein the work station wagons are moved by means of connection elements to the circulating chain drive which are provided and/or engaged on the wagons on one side.

The design of work stations in the form of independent work station wagons is particularly applicable when the initial and/or subsequent fitting out of the work station, or intermediate working steps which cannot be carried out on the chain, are carried out away from the conveyor system in terms of location. In this case, it may be necessary to remove individual work station wagons from the chain cycle and/or insert them into it.

SUMMARY OF THE INVENTION

The present invention relates to a device for carrying out a sequence of working steps on travelling work station wagons comprising a) an oval track wherein said work station wagons are circulating, wherein said wagons comprise at least one detachable connection element connected to a circulating chain which moves said wagons;

b) at least one insertion and at least one removal guide track is provided on the outside of said oval track, wherein said at least one insertion and at least one removal guide track comprises a transfer point to which the chain is allocated;

c) at least one coupling element is further provided at each transfer point via which the wagons may be coupled into the guide tracks on the side opposite of the side of said wagons comprising at least one detachable element, with at least one switchable points element located on said guide track, which during the insertion position, release said at least one coupling element and bring about the engagement of said detachable connection element to said chain or during the removal position, couple the coupling elements and removably detach said at least one detachable connection from said chain.

DETAILED DESCRIPTION OF THE INVENTION

Figure 1:
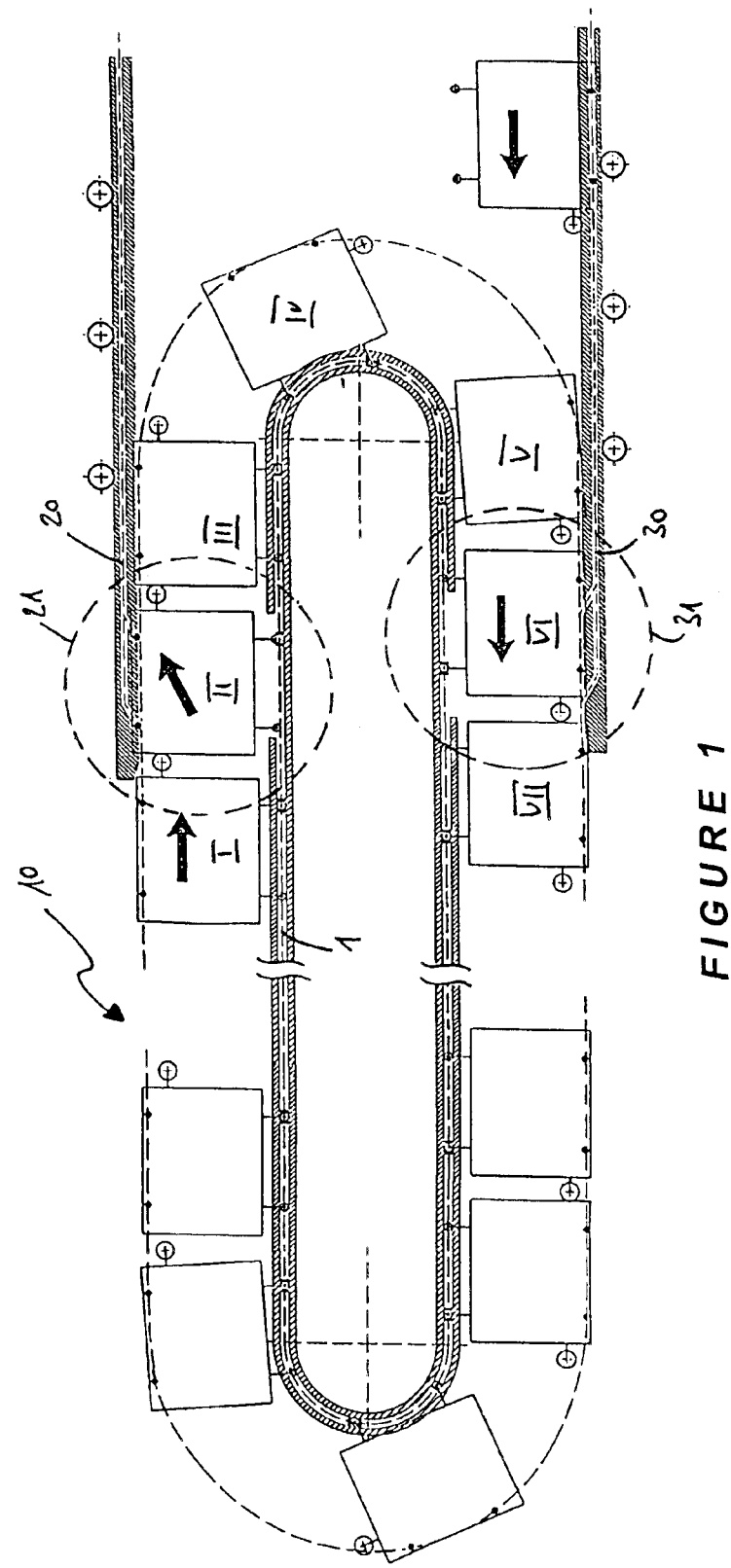
FIG. 1 is a diagram of the device of the present invention.

The present invention provides a device for carrying out a uniform sequence of working steps on travelling work station wagons circulating on an oval track, wherein the wagons are moved by means of detachable connection elements to a circulating chain drive. The detachable connection elements are provided and/or engaged on one side of the wagon. The device of the present invention also comprises at least one insertion and at least one removal guide track, to each of which a transfer point to the chain is allocated and is provided on the outside of this oval conveyor system. Coupling elements are further provided via which the wagons may be coupled into the guide tracks. On the other side of the wagon, switchable points elements are provided, in which insertion/removal positions release the connection elements and couple the coupling elements for removal purposes and/or uncouple the coupling elements and bring about the engagement of the connection elements for insertion purposes, which are provided at each transfer point.

An embodiment of the present invention comprises the chain circulating in an oval, for example, and the chain running in a guide channel. The wagons have guide rollers running on vertically projecting mountings in the guide channel and the wagons also comprise at least one carrier pin, wherein carrier cages located on the chain removably engage the carrier pin on the wagon. On the chain side, the transfer point may be designed in such a way that the outer boundary of the guide channel is interrupted so that the guide rollers may emerge laterally out of the guide channel and the carrier pin laterally out of the carrier cage which is open towards the outside.

In an embodiment of the present invention, the insertion and removal tracks may take the form of guide channels which are arranged parallel to the chain drive and at a distance from its guide channel, wherein the distance between the chain and the guide channel of the insertion/removal track approximately corresponds to the width of the work station wagon. On the outside of the wagon, guide rollers are then also provided, which run in the guide channel of the removal guide track after transfer from the chain to the removal guide track. At the transfer point, the guide channel of the removal guide track has interruptions, which are closed by means of points tongues if no transfer is to take place. If the wagon, which passed by the transfer point is to be removed, the points tongues are switched in such a way that they guide the guide rollers of the wagon into the guide channel of the removal track.

The insertion point is correspondingly designed. When inserting a wagon, care should be taken to ensure that the work station wagon is inserted in an accurately positioned manner with respect to the connection element to the chain, and with respect to the embodiment of the present invention, that the carrier pin of the wagon is introduced into the carrier cage of the chain.

Therefore, the present invention preferably provides that each work station wagon has a spacer with respect to the next wagon, wherein the spacing of the connection element parts on the chain (i.e., the carrier cages) have a spacing which corresponds to the length of the wagon and spacer combined. In this way, the wagon to be inserted is inserted at the free place on the chain, wherein the following wagon with its spacer pushes the wagon to be inserted precisely into the position in which the connection to the chain takes place.

Preferably, the insertion guide track has a load-dependent drive in which the maximum speed is higher than the chain speed. Preferably, the insertion guide track has a friction drive, which engages on the outer side (relative to the oval) of the wagon. This ensures that prior to transfer, the wagon to be inserted has a higher speed than the following wagon on the chain, so that during the transfer, the wagon to be inserted is pushed into the transfer position by the spacer of the following wagon.

The invention will be explained in greater detail with the aid of the drawings which follow:

FIG. 1 shows a carousel 10, with the chain 1, circulating in an oval, on which the work station wagons denoted by Roman numerals circulate. A removal guide track 20 and an insertion guide track 30 are also shown in diagrammatic form. The transfer points are denoted by the broken-lined circles 21 and 31.

Figure 2:
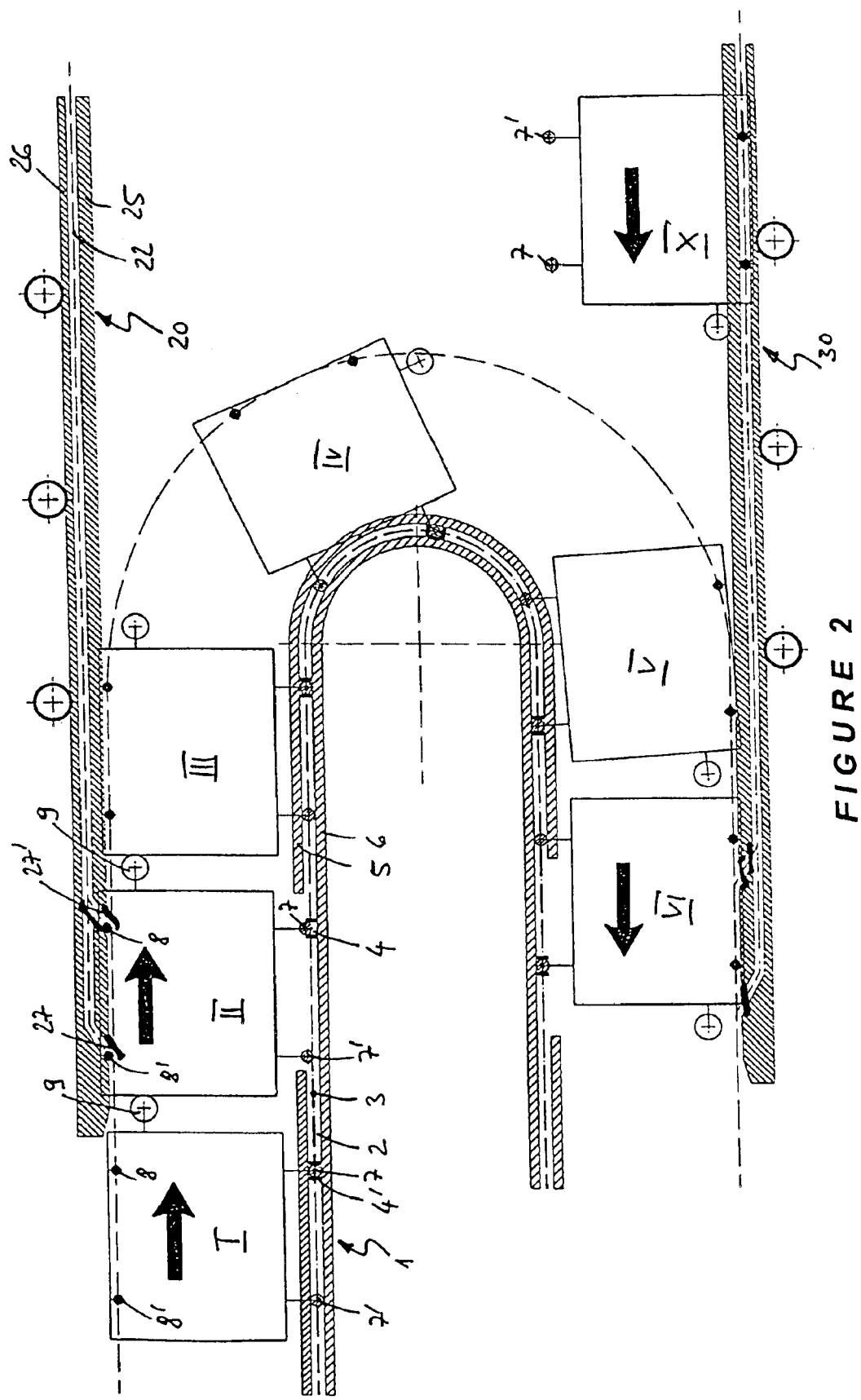
FIG. 2 is an enlarged diagram of the device of the present invention showing the circulating chain drive with a guide channel.

The enlarged view of FIG. 2 shows that the circulating chain drive 1 comprising a guide channel 2, which is formed by the two guide strips 5 and 6, wherein the drive chain 3 runs inside the guide channel 2. The chain has carrier cages 4a, 4b, functioning as a connection element part on the chain side to receiving such connection element from the wagon. The carrier cages 4a, 4b are arranged at a regular spacing. Guide rollers 7a, 7b, which run in the channel 2 as long as the wagon is guided on the chain are provided laterally on the work station wagons denoted by Roman numerals and are removably fastened to carrier cages 4a and 4b, respectively.

The removal guide track 20 also consists of a channel 22, which is formed by guide strips 25 and 26. On the side facing away from the chain drive the work station wagons have guide rollers 8a and 8b which in the event of transfer are engaged by switchable points tongues 27a and 27b and are guided into the guide channel 22 of the removal guide track 20; see wagon II. On the side opposite the points 27a and 27b, the guide strip 5 comprises a break or interruption so that the guide rollers 7a and 7b belonging to the wagon to be removed, are moved out of the guide channel 2 and out of the carrier cage 4a and 4b, respectively.

Figure 3:
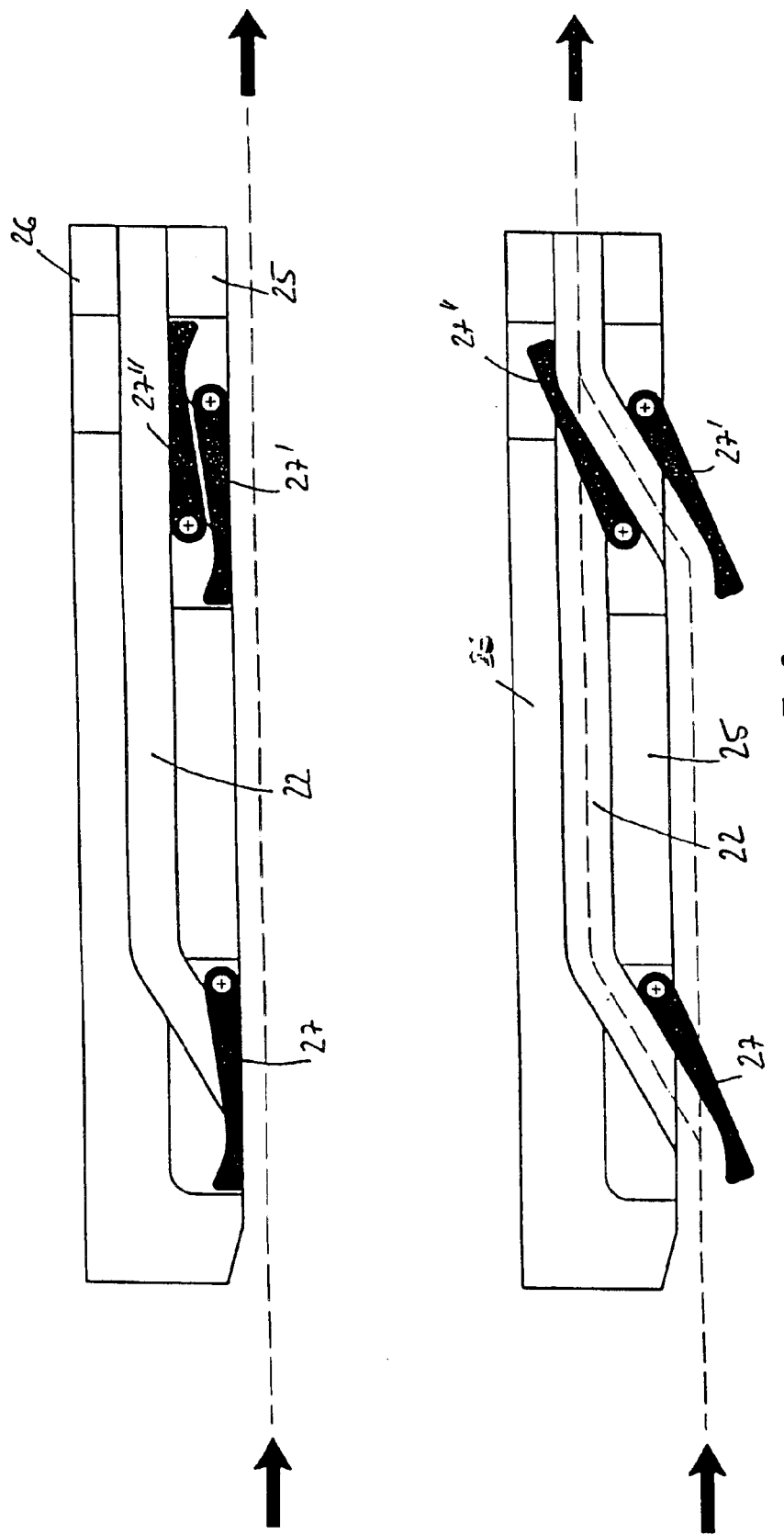
FIG. 3 shows an enlarged view of the points tongues of the device of the present invention.

FIG. 3 shows an enlarged view of the points tongues, wherein the numerals denote elements identical with FIG. 2. The top view shows the points tongues in the "transit" position, the bottom view shows the points tongues in the "transfer" position.

Figure 4:
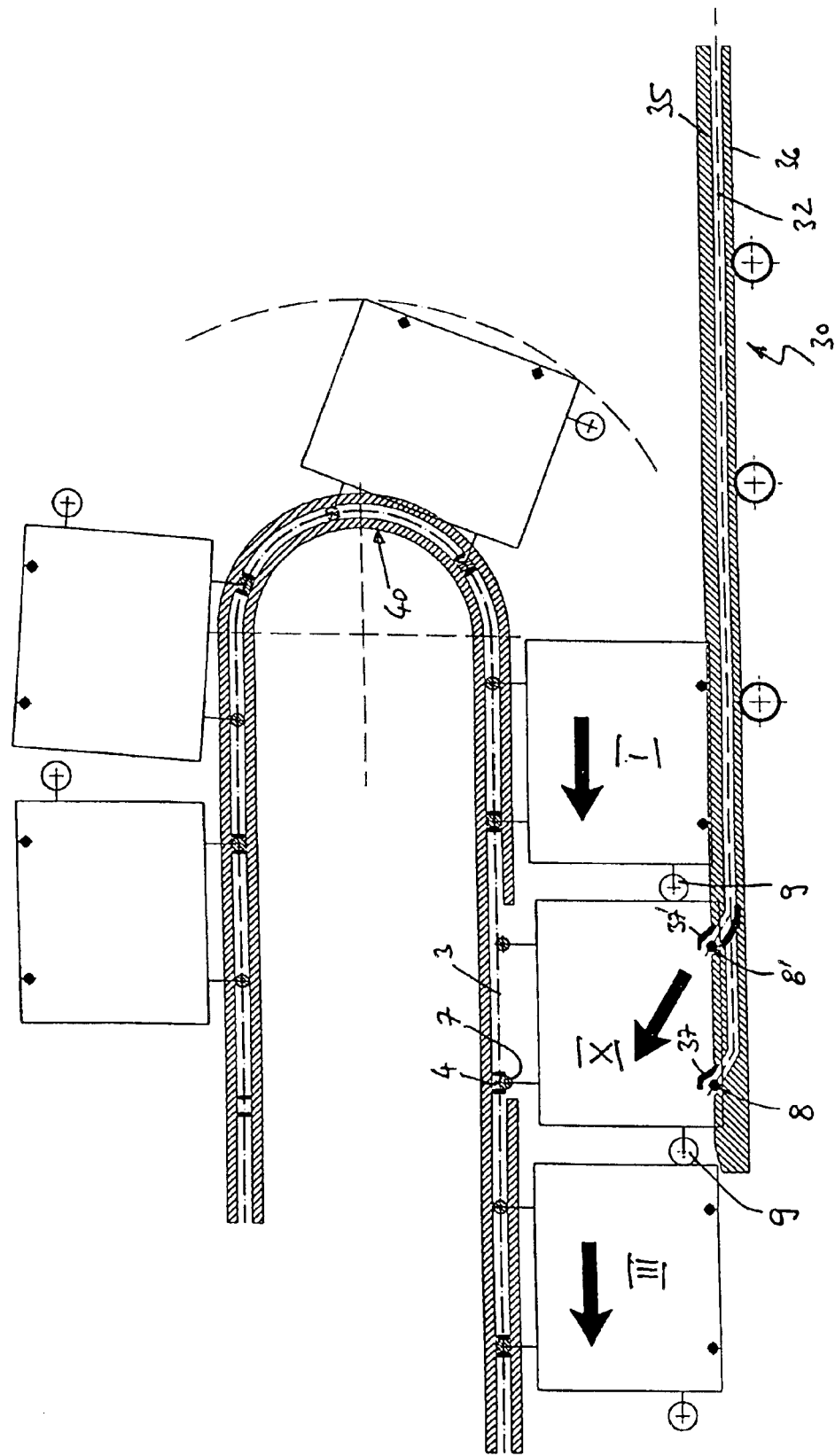
FIG. 4 shows an enlarged view of the insertion of wagon X into the device of the present invention.

FIG. 4 shows the insertion of wagon X, still in the waiting position in FIG. 2, at the position in which wagon II is removed in FIG. 2. The end phase of the insertion, which explains the correct position for connection to the chain 3, is shown. In the region of the deflection 40 of the chain, the work station wagons are considerably wider apart. In this region, wagon X is initially pushed in front of wagon I. At the time of transfer, i.e., when the guide rollers 8a and 8b of wagon X reach the points tongues 37a and 37b, wagon X to be inserted, is accurately positioned between wagons I and III via the spacer 9 so that the guide rollers 7a and 7b are accurately positioned in the carrier cages 4a and 4b of the chain 3.

It will be readily apparent to the person skilled in the art that the connection elements between circulating chain and work station wagons, and the coupling elements to the insertion and removal guide tracks, may be designed differently from the views shown by way of example. For example, they may take the form of switchable electromagnets or rocker heels. It is essential to the invention that the guiding of the work station wagons for the purposes of this invention, insertion takes place on the one side and removal takes place on the other side, so that complicated points, in which that wagons must pass over structures, are avoided on the circulating chain drive. Both the circulating chain drive and the insertion and removal guide tracks may be arranged above the shopfloor without forming obstacles to the work station wagons travelling on their own wheels.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for conveying work station wagons through a plurality of working steps comprising:

a) an oval track around which said work station wagons travel, said oval track comprising i) a first guide strip forming a continuous first oval, ii) a second guide strip spaced apart from said first guide strip and forming a second, larger oval, thereby forming a guide channel which is formed between said two guide strips, iii) a drive chain, comprising carrier cages, travelling inside said guide channel, and iv) said second guide strip having at least two gaps in its circumference, b) an insertion guide track located outside said second guide strip, with a portion of said insertion guide track being parallel to a portion of said second guide strip, and having a load-dependent drive in which the maximum speed is higher than the chain speed, c) a removal guide track, comprising coupling elements selected from the group consisting of switchable electromagnets, rocker heels, and switchable points tongues, located outside said second guide strip, with a portion of said removal guide track being parallel to a portion of said second guide strip, d) each of said work station wagons having i) at least one first guide roller mounted on a vertically projecting mounting provided on one side of said work station wagon, said first guide roller being removably connected to said drive chain and ii) at least one second guide roller provided on the side of said work station wagon opposite from said first guide roller, said second guide roller connecting said work station wagon to said removal guide track, and iii) a spacer that A) defines the minimum distance between said work station wagons when said work station wagons are engaged with said drive chain and B) contacts the preceding work station wagon engaged with said drive chain, with said device operating as follows:

1) said work station wagons are moved along said insertion guide track by a load-dependant friction drive to a location where said first guide roller pass through one of said gaps and engage a carrier cage on said drive chain, 2) said work station wagons are conveyed along said oval track, and 3) once said work station wagons reach another one of said gaps, said first guide roller is disengaged from the carrier cage on said drive chain and said workstation wagons are connected via said second guide roller to a coupling element on said removal guide track.

2. The device of claim 1, wherein the insertion guide track has a friction drive, which engages on the outer surface of the wagon.

3. The device of claim 2, wherein a wagon to be inserted has a higher speed than a following wagon on the chain, so that during a transfer, the wagon to be inserted is pushed into the transfer position by the spacer of the following wagon.

* * * * *